No. 878,648. PATENTED FEB. 11, 1908.
A. A. LOW.
CUTTING IMPLEMENT.
APPLICATION FILED JUNE 21, 1907.

Witnesses:
D. W. Gardner
Florence G. Garner

Inventor:
Abbot Augustus Low
By his Attorney
Geo. Wm. Miatt

ABBOT AUGUSTUS LOW, OF HORSESHOE, NEW YORK.

CUTTING IMPLEMENT.

No. 878,648.

Specification of Letters Patent.

Patented Feb. 11, 1908.

Application filed June 21, 1907. Serial No. 380,011.

*To all whom it may concern:*

Be it known that I, ABBOT AUGUSTUS LOW, a citizen of the United States, residing at Horseshoe, St. Lawrence county, and State of New York, have invented certain new and useful Improvements in Cutting Implements, of which the following is a specification.

My present invention is designed to afford a cutting implement adapted to cut flower stems and the like obliquely with relation to their length, and consists in the special construction and arrangement of parts hereinafter described and claimed specifically.

Figure 1:
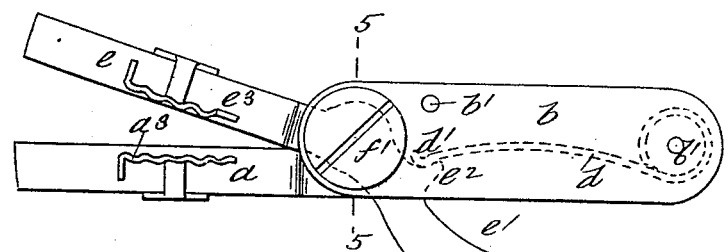
Figure 2:
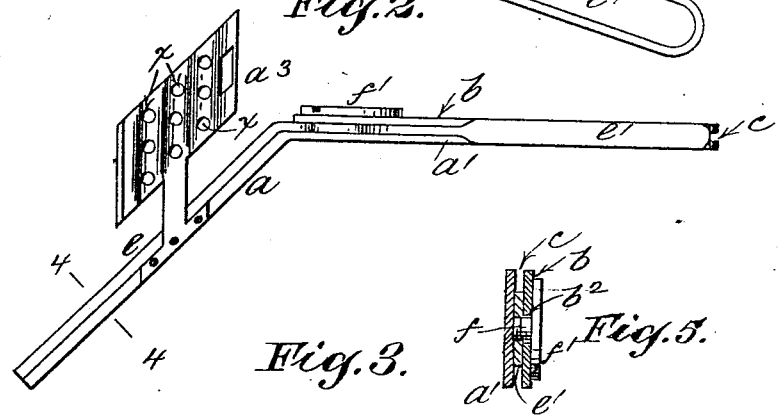
Figures 3, 5:
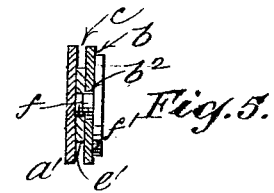
Figure 4:
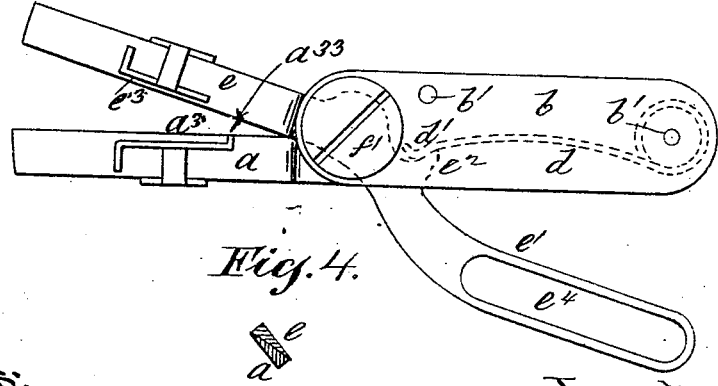

In the accompanying drawings, Figure 1, is a top view of my improved cutting implement open; Fig. 2, a side elevation thereof, closed; Fig. 3, a view like unto Fig. 1, showing a modification in the form of gripping jaws; Fig. 4, is a transverse section upon plane of line 4—4 Fig. 2; Fig. 5, a section upon plane of line 5—5 Fig. 1.

What may be designated as the stationary blade $a$, is formed with a shank, consisting essentially of a handle plate $a'$, to which is secured a corresponding plate $b$, by means of rivets $b'$, said plates $a'$ and $b$ constituting the handle of the device. Between these plates $a'$ and $b$ is a space $c$ in which is situated the spring $d$, attached to the plate $b'$, (as will be seen by reference to Fig. 1) the free end of said spring resting upon the upper side of the shank $e'$, of the movable blade $e$ which latter is pivotally supported on the plate $b$, by means of the screw $f$, passing through the hole $b^2$ in said plate and screwing into the forward end of the shank $e'$ as shown in Fig. 5.

$e^2$ is a stop or bearing upon the upper side of the shank $e'$ for engagement with the free end $d'$, of the spring $d$.

The head $f'$ of the screw $f$ acts to retain and bind the movable member $e$, $e'$, to the plate $b$.

The main novelty in the present case consists in making both the stationary and movable blades inclined with relation to their shanks so that the latter may be held and manipulated horizontally while cutting a vertical flower stem or similar article obliquely to its length, as is especially customary and desirable when cutting plants. The inner surfaces of the blade, or those that overlap each other when the blades are closed, are curved slightly to compensate for the inclination, that is to say, the underside of the upper movable blade is slightly concave while the upper side of the stationary blade $a$, is slightly convex, the curvature in each being formed with regard to the center of the screw $f$, as a radius. This slight curvature is shown in cross section in Fig. 4.

The lateral gripping blades $e^3$, $a^3$, are attached to the blades $e$ and $a$, and are preferably formed of spring metal. These elastic gripping jaws $e^3$, $a^3$, are for the purpose of affording a lateral support to the flower stem or other article to be severed by the cutting edges, their novelty in the present case so far as these gripping jaws are concerned consisting in corrugating them transversely as shown in Figs. 1 and 2, and in forming them with perforations $x$, as shown in Fig. 2, so as to increase the grip or frictional contact exerted against the object interposed between said grippers. Incidentally I form the gripper $a^3$ on the stationary blade $a$ with a heel or shoulder $a^{33}$. Another incidental feature consists in forming the shank $e'$ of the movable blade $e$ with a slot $e^4$ to accommodate the fingers of the user if desired.

What I claim as my invention and desire to secure by Letters Patent is,

1. In a cutting implement of the character designated, the combination of a stationary blade formed with a rigid handle set at an angle with relation to the plane of the blade, a movable cutting blade pivoted to the stationary blade and moving in a plane parallel thereto, and opposed elastic gripping jaws on said blades having bearing surfaces inclined obliquely with relation to the plane of cut, for the purpose described.

2. In a cutting implement of the character designated, the combination of a stationary blade formed with a rigid handle, a movable blade pivoted to the stationary blade and moving in a plane parallel thereto, and opposed elastic corrugated gripping jaws on said blades, for the purpose described.

3. In a cutting implement of the character designated, the combination of a stationary blade formed with a rigid handle, a movable blade pivoted to the stationary blade and moving in a plane parallel thereto, and opposed elastic gripping jaws on said blades, said gripping jaws being formed with holes for the purpose described.

4. In a cutting implement of the character designated, the combination of a stationary blade formed with a rigid handle, a movable blade pivoted to the stationary blade and moving in a plane parallel thereto, and opposed elastic gripping jaws on said blades said gripping jaws being perforated and corrugated for the purpose described.

ABBOT AUGUSTUS LOW.

Witnesses:
D. W. GARDNER,
GEO. WM. MIATT.